Figure 1A:
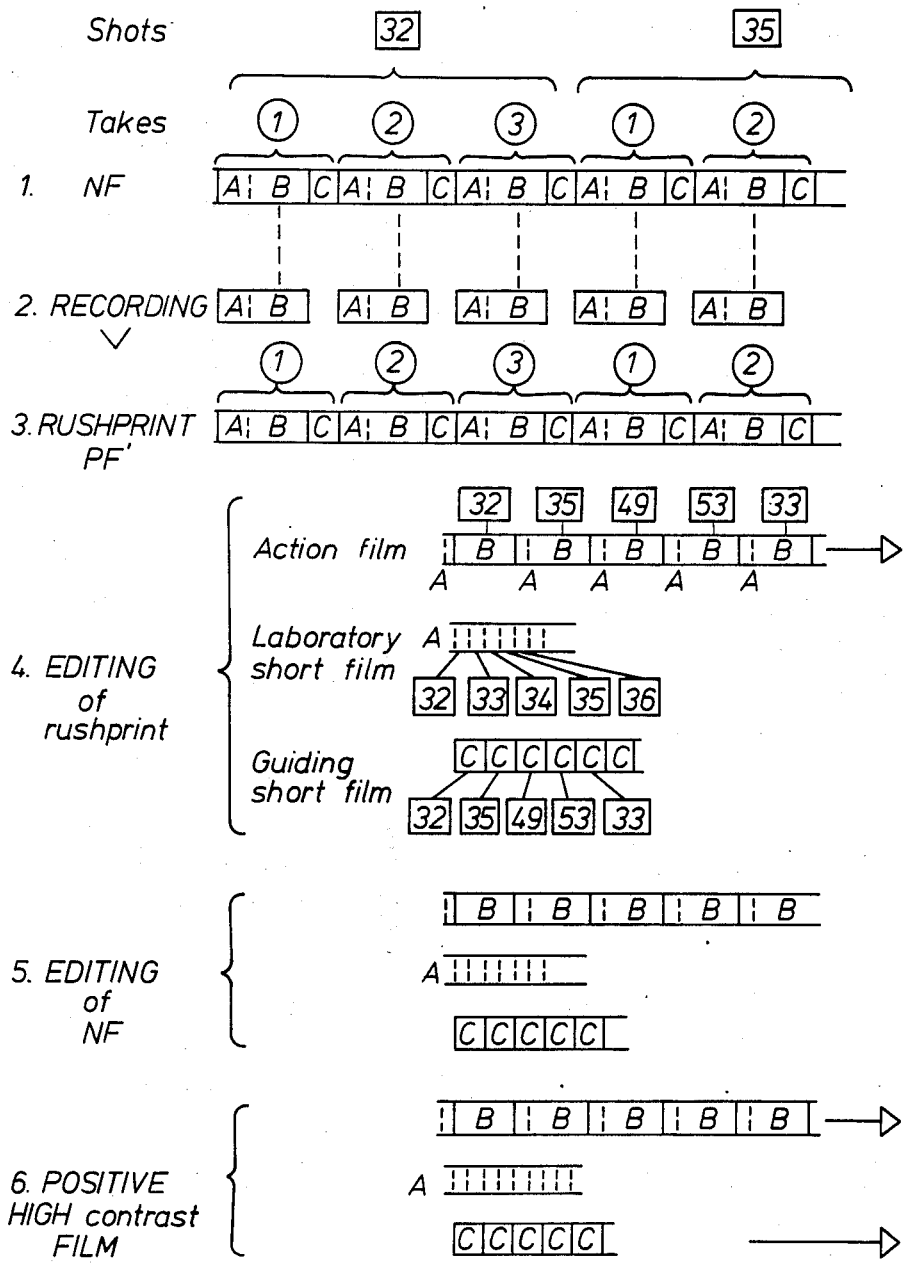

United States Patent [19]

Servais

[11] Patent Number: 4,695,141

[45] Date of Patent: Sep. 22, 1987

[54] METHOD FOR THE PRODUCTION OF A COMBINED LIVE-ACTION AND ANIMATION MOTION PICTURE FILM

[75] Inventor: Raoul Servais, Middelkerke, Belgium

[73] Assignee: AGFA-Gevaert N.V., Mortsel, Belgium

[21] Appl. No.: 810,356

[22] Filed: Dec. 18, 1985

[30] Foreign Application Priority Data

Dec. 24, 1984 [EP] European Pat. Off. ........ 84116294.4

[51] Int. Cl.⁴ ............................................. G03B 19/18
[52] U.S. Cl. ........................................ 352/50; 352/51; 352/52; 352/87
[58] Field of Search .................... 352/46, 47, 48, 49, 352/50, 51, 52, 87

[56] References Cited

U.S. PATENT DOCUMENTS

| | | | |
|---|---|---|---|
| 1,416,154 | 5/1922 | Ahbe | 352/51 |
| 1,446,123 | 2/1923 | Lederer | 352/48 |
| 2,130,541 | 9/1938 | Fleischer | 352/50 |
| 2,181,405 | 11/1939 | Kosa | 352/51 |
| 2,281,033 | 4/1942 | Garity | 352/49 |
| 2,501,958 | 3/1950 | O'Brien | 352/47 |
| 2,998,313 | 8/1961 | Maurer | 352/46 |
| 3,301,626 | 1/1967 | Maurer | 352/51 |
| 3,731,995 | 5/1973 | Reiffel | 352/50 |
| 3,809,463 | 5/1974 | Winchell | 352/50 |

Primary Examiner—Monroe H. Hayes
Attorney, Agent, or Firm—William J. Daniel

[57] ABSTRACT

The method comprises the production of a live-action film of subjects acting against a white background, making black-and-white subjects enlargements with grey gradation of useful film frames, drawing separate contour images from these enlargements, painting transparent cells from the contour images, and using each subject enlargement in superposition with the corresponding painted cells for exposure with a background image, in an animation camera.

9 Claims, 8 Drawing Figures

II. MAKING OF SERVAISGRAPHS

III. PAINTING AND FRAME BY FRAME SHOOTING OF THE SERVAISGRAPHS a. Selection of images on editing machine →▷ b. Test shooting on frame by frame videostand c. Form with selected frame →▷ Enlargments for animation   →▷ CONTOURING
                                    ↓
                                  PRINTING       ⎫
→▷ Enlargments for lay-out   →▷ LAY-OUTS         ⎬ FRAME BY FRAME SHOOTING
                                    ↓            ⎭
                                  BACKGROUNDS

FIG. 1b

METHOD FOR THE PRODUCTION OF A COMBINED LIVE-ACTION AND ANIMATION MOTION PICTURE FILM

The present invention relates to a method for the production of a combined live-action and animation motion picture film.

Films wherein actors evolve in an artificial environment are known, and the production of suchlike films may resort to classic trick techniques such as the color-key/blue process, the Shüfftan shots, the bi-pack process, the rear/front projection, etc. All these trick processes aim to provide a picture wherein the evolution of the actors is as realistic as possible.

The object of the present invention is to provide an improved production method for animation-type film wherein the actors as well as the environment (the background) get a plastic dimension that deviates from photographic reality and that becomes more related with the art of lithography without, however, approaching the deformation or the styling of known animation film.

According to the present invention, a method for the production of a combined live-action and animation picture film, by exposure of subsequent frames of a motion picture photographic color film in an animation camera to the combination of a background image and a superposed cel of the characters, and by processing the exposed film is characterised by the steps of producing photographic positive-type transparent enlargements, i.e. servaisgraphs, of the characters of selected frames of a live-action film of actors in a format which corresponds with the format of the background image, producing contour images from the live-action characters of the servaisgraphs, using the character contour images as a base to paint the corresponding cels of the characters, and mounting each servaisgraph in register with the corresponding cel of the characters, and combining each said sandwich with the background image for exposure of the color film in the animation camera.

The meaning of different terms used in the statement of invention is as follows.

The "animation camera" is a step-by-step motion picture camera as generally used for cel-animation shooting.

A "background image" is the artwork that serves as a setting for the animated action. Traditionally, animation backgrounds have been done in water color, oil color, etc., but more recently backgrounds have been rendered in a variety of media such as pastels, colored markers, collages made from magazine pictures, etc. The background may be combined with overlays painted on cels to give an illusion of depth and allow a character to move within a setting, rather than just in front of it.

A "cel of the characters" is a transparent sheet, usually of clear cellulose triacetate, on the back of which the drawings are painted by painters according to precise color models that show what color is to be used where on each character.

Although normally only one cel of the characters and the corresponding servaisgraph is used with the background for exposure in the animation camera, it should be understood that a combination of two or even more of the mentioned sandwiches may be used on the background for one exposure.

The word "actor" stands for a living person, animal, and also for any mechanically or hand-operated object or figure capable of evolving in a scene. In the further description of the invention it will be explained that film fragments of deceased actors as well may be used for the performance of the method according to the invention.

The word "servaisgraph" has been coined to provide for a readily description term that will be used throughout the specification to indicate the photographic positive enlargements of the corresponding actor images of the live-action film.

The "combining" of the mentioned sandwich with the background images does not necessarily mean that the sandwhich is put in physical contact with the background painting. As a matter of fact there may be a notable separation between a sandwich and the background and this may be used in a so-called multiplane animation stand wherein an illusion of great depth is created.

The term "contour image" indicates the drawing that is made by an artist from a servaisgraph to obtain a picture wherein all the areas of a figure that later will have to be painted in a different color, are defined by a single fine outline. The contours may be drawn with pencil on tracing paper.

An advantage of the method according to the invention is that each actor scene in the production of the film is treated integrally so that one sandwich of a servaisgraph and the corresponding cel constitutes a complete animation selection. Usually 24 selections cover one second of projection.

According to a preferred embodiment of the invention, the live-action film is a negative black-and-white film which has been taken from the actors performing on a white infinite background, and frames of a positive copy of this film, wherein the background is completely transparent, are used for making the enlargements of the live-action images to produce the servaisgraphs.

According to a further preferred embodiment of the method according to the invention, the servaisgraphs are made by exposing the image of each relevant frame of the positive copy of the live-action film (preferably together with the image of appropriate register marks) on a negative-type silver halide diffusion transfer sheet, developing said transfer sheet, and transferring the positive image of the live-action film (and of the register marks) onto a positive-type diffusion transfer sheet.

The advantage of this method is that continuous tone reproduction is possible in a one bath processing system, so that the process may be carried out simply and rapidly by means of uncomplicated apparatus.

The servaisgraphs are preferably punched to provide register holes in relation to the register marks on the sheet, the register holes corresponding with the register pegs of the animation camera. This punching may be done in the punching device by manually adjusting the sheet with the sheet marks in conformity to like marks on the device, but preferably this punching is done in an automatic way in apparatus in which the sheet or punch position is controlled to obtain coincidence of the two types of marks.

Figure 2A:
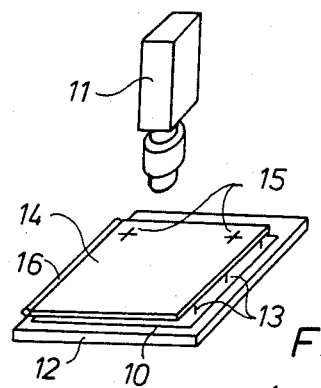
Figure 2B:
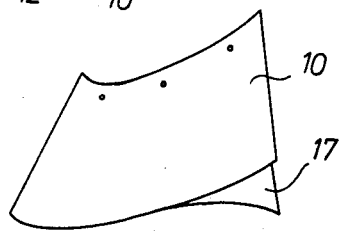
Figure 2C:
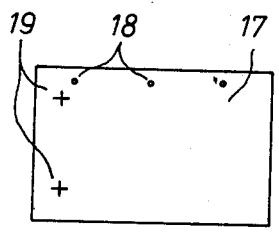
Figure 3A:
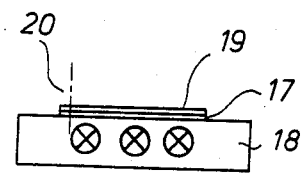
Figure 3B:
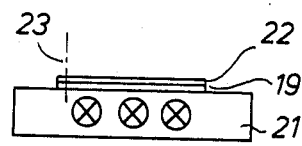
Figure 4:
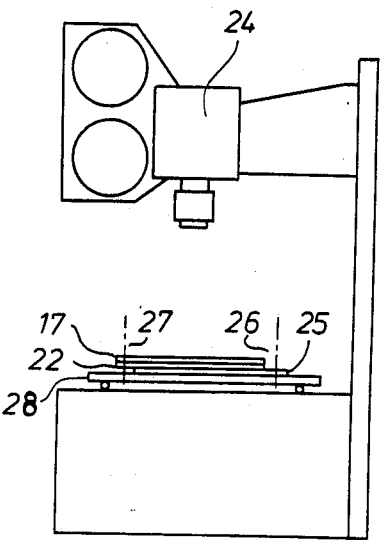

The invention will be described hereinafter by way of example with reference to the accompanying drawings, wherein:

FIGS. 1a and 1b illustrate the steps of processing the live-action film, making the servaisgraphs, and shooting the servaisgraphs, FIGS. 2a to 2c illustrate the production of the cels, FIGS. 3a and 3b illustrate the drawing of the contour images, and the painting of the cels, FIG. 4 illustrate the final exposure of the composite image in the animation camera.

The process for making an animation film can be roughly defined as comprising three phases: a first phase, a central phase, and a final phase. The first and the final phases in the process according to the invention are identic to those in conventional cel-animation film making.

The first phase comprises the drawing of a complete story-board of the scenario. On this document or on this board all the important moments of every shot of the film are presented. A drawing is used to demonstrate what each shot in a scene will look like. Lines of dialogue and/or descriptions of the action accompany each drawing. The set designer, the lay-out man and the background artist will find sketchlike indications for the design of the sceneries. The drawings may be rearranged or replaced as the complete film concept is refined.

On the story board, the actors, and the occasional scenery elements or stage-properties are localised in the image composition, which is very useful for the director of photography and the head-cameraman during the live-action recordings. All camera movements are also mentioned on the story board. They provide information for the animation recording rather than for the live-action recording.

The central phase of the process comprises the production of the character cels and of the background image.

The final phase comprises the recording of the film on the animation stand. The camera of the stand is essentially a motion picture camera with single frame, reverse, dissolve and fade capabilities. The stand has a table-like structure which has different sets of pegs that hold the artwork while it is being photographed. Usually the background is placed on the top pegs. The background is kept in place throughout the scene while the operator changes the cels of the characters on the front pegs. The animation stand is usually arranged to create certain moves and effects like trucks, rotations, tilts, pans, etc.

Returning now to the central phase in the process this comprises first the taking of the live-action in the studio. The actors acting on a completely white scenery are filmed, on a black-and-white negative-type film with very fine grade. Dialogues and special sound effects are recorded simultaneously on magnetic tape.

The camera speed is usually 24 images per second, but higher as well as lower camera speeds are used occasionally. Starting from the "clap", each frame of the exposed film gets a successive number.

The numbering of the frames preferably occurs automatically during the live-action recording of the film. To this end, the camera may be provided with a device that optically projects during the image-wise recording of the film, the image of consecutive numbers of a numbering system on the area that is provided for the optical sound-track of the film. Further, it may also be considered to write a numbering, or any other suitable identification data as the case may be, on the film sound track by means of a later exposure.

Finally, the numbering of the frames may also be carried out by hand. If such numbering occurs on the original live action film, the advantage is obtained that all the successive copies of the film bear the identification data. In order, however, to avoid occasional damaging of the original film during the manipulation thereof, it may be safer to perform the numbering on the copy of the original film.

The stage consists of a large white space with an infinite cross-over from the floor towards the wall. The area which will be filmed must be very uniformly, diffusely, illuminated. This requires a considerable amount of energy, in the case of long shots, but if the action is concentrated in a limited part of the scene, an important light-saving may be obtained by illuminating only the relevant part of the scene, and by placing in front of the cameralens a white screen that covers the field of view of the camera, and that is provided with a central opening that corresponds with the part of the scene where the action occurs. The white portion of the screen is illustrated by a separate source to expose the film with the required light intensity. A suitable form of such screen is glass panel that has been painted in white, except for a central zone which corresponds with the field of the action.

The recording of the live-action is, as usually, preceded by the filming of the clapper board which indicates the title, number of shot and take and also the grey card for the processing control. At the end of the live-action take, some frames of images are needed for guidance for the layout-man and the background designer. Such images must be under-exposed, or they must be exposed with contrasting illumination unlike diffuse illumination as used for the live-action recording in order that, apart from the actors, the occasional scenery attributes, which are painted in white, would become clearly recognizable for the layout-man. The layout-man is the artist working out the subject-background relationship. He has to take into consideration the live-action in accordance with the set elements and make very precise contour drawings for the background artist.

The white painted scenery attributes are mainly destinated as "overlay" elements (for instance, if an actor appears from behind a street corner, or if his upper body only is visible in a window opening).

Moving scenery elements, such as opening doors, are better not painted in white. Common scenery elements are used here preferably, because, as they move, every single frame would otherwise need a very sophisticated painting imitating the texture and the changing lighting and shadows of those moving set elements.

It is clear that the test strips and also the stage strips will be provided with numbers of the shot and the take.

The costuming of the actors is important. White or pale dresses are not suited unless they are provided with a pattern of bars, blocks, or the like that provides sufficient contrast with the background to enable the later contouring.

The condition of sufficient contrast applies as well to the make up of the actors. Eyelashes may be accentuated. The hair of the head should preferably be smooth and flattened without too much cure or undulations. Loose hairs are in most cases to be avoided.

The recording of the live-action film is preferably accompanied by a video-recording of the action. The video-recording can instantly be reviewed and it provides useful information for the director of photography, the cameraman, the script-girl, and not in the least for the actors themselves, and the film-director.

The responsibilities of these different people are as follows.

The director of photography has to take care for a good balanced grey gradation of the actors, and for a good contrast between the actors and/or objects and the white background.

The cameraman shall keep a reserve on the four margins of the image so that frame corrections can still be carried out at the final frame-by-frame exposures. It will be understood that the task of the live-action cameraman is easy since a great deal of the camera movements occur in the animation camera.

The script-girl takes the usual notitions, but she must also pay attention to aspects that are directly related with the new process. For instance, it may occur that for one shot two or more takes must be made of actors who evolve separately in each scene, but who are joined in one image during the recording in the animation camera.

The central phase of the film making process is described in detail with reference to the illustrations of FIGS. 1 to 3.

Referring to FIG. 1a, column I relates to the different steps in the recording and printing of the live-action film, whereas in FIG. 1b column II indicates the animation making of the servaisgraphs, and column III relates to the painting and the frame-by-frame shooting on the servaisgraphs.

Line 1 illustrates the recorded live-action film, each take being as usually, preceded by the filming of the clapper board and a grey chart. After the shooting of the take, if necessary, but in anyway after the shooting of all the takes of a shot, some frames are filmed with a contrasting illumination of the set and preferably with the actors on it (guide images).

The clapper board/grey card images are indicated by A.

The proper action is indicated by B.

The guide images are identified by C.

The film provides a negative-type image, and has therefore been indicated by NF. It has been shown that a suitable photographic material for these records is the GEVAPAN 30, negative film 166, which is a medium-sensitive fine grain film for cinematographic exposures.

Line 2 illustrates the videorecordings V that are made simultaneously with the exposure of the film.

Line 3 illustrates the rush print of the film under line 2. The rush print is a positive copy (PF) on black-and-white high-contrast film. A suitable photographic film for this purpose is Agfa-Gevaert positive super contrast film 553.

Line 4 illustrates the editing of the rush print. The best take of each shot is kept. The selected takes of each shot are assembled in the same order as the shooting, which is very rarely in chronological order. The start images, with clapper board and grey chart (A), remain partly in this editing (for later identification). A couple of these frames, however, must be assembled in chronological order on a separate reel indicating thus the corresponding images on the negative which will be used for the laboratory tests ("bande courte" in French).

The guide images (C) will also be assembled on a separate reel, not in chronological order but in shooting order. They also indicate the corresponding images for editing the negative guide strip.

Line 5 illustrates how the different parts of the negative film under point 2, are montaged in accordance with the mounted rush print of line 4.

Line 6 illustrates how the sections A, B and C of the edited negative film are copied on positive black-and-white film of high-contrast. A first copy will be used for the production of the servaisgraphs as will described hereinafter, and a second copy is a reserve copy.

The animation of the live-action film is done as follows. The montaged rush print, see line 4 of FIG. 1a, is analysed on the montage stand by animators under the supervision of the animation director. The editing machine is so arranged that also the sound track of the film is visible, since this contains the numbering of the individual frames. The animator transforms at this stand a real motion into a synthesized animation-like motion. By the elimination or repetition of images he can accelerate or decelerate the action. Motions can also be repeated, reversed, frozen, etc. The animator notes the numbers of the retained frames of the rush film on appropriate forms.

The animator is assisted in his work by means of a video image-by-image recording of the selected frames. Once the test recording has been approved by the director of animation, the form with the selected frame numbers is passed to the service where the servaisgraphs are made from the positive copy of the live-action film, see line 6.

The servaisgraphs are generated from two elements, namely a series from the selected live-action images B and a series from the guide images C. Both series are made according to the silver complex diffusion transfer process, hereinafter called the DTR-process.

In the DTR-process, silver complexes are image-wise transferred by diffusion from a silver halide emulsion layer to an image-receiving layer, where they are converted, optionally in the presence of development nuclei, into a silver image. For this purpose, an image-wise exposed silver halide emulsion layer is developed by means of a developing substance in the presence of a so-called silver halide solvent. In the exposed parts of the silver halide emulsion layer the silver halide is developed to silver so that it cannot dissolve any more and consequently cannot diffuse. In the non-exposed parts of the silver halide emulsion layer the silver halide is converted into soluble silver complexes by means of a silver halide complexing agent (a so-called silver halide solvent) and transferred by diffusion to an adjacent image-receiving layer or to an image-receiving layer brought into contact with the emulsion layer to form, usually in the presence of development nuclei, a silver, or silver-containing image in the image-receiving layer. By the use of a negative silver halide material a positive silver image is obtained in the image-receiving material. More details on the DTR-process can be found in "Photographic Silver Halide Diffusion Processes" by A. Rott and E. Weyde, Focal Press, London, New York (1972).

Referring to FIG. 2a a negative-type silver halide diffusion transfer sheet 10 of material (called hereinafter the negative sheet) is exposed by means of a step-by-step projector 11 to a positive image of the positive copy of the live-action film. The projector has a very accurate transport system for the frame-by-frame transport of the film loaded therein, an image-counter, a zoom lens, and an efficient cooling system for the light-source. The base of the projector is provided with a table-like structure 12 which is provided with pegs 13 for registering with corresponding holes in the negative sheet punched previously in the darkroom. The sheet 10 is kept flat on the table by means of a glass plate 14 which is provided with register marks such as crosses 15. The plate may be hingedly connected to the table by hinges as diagrammatically shown at 16.

The punching of the negative sheet is not directly necessary for the registering of the image produced on the sheet since the exact position of the image on the sheet format is lost in any case during the image transfer. However, the sheet perforations make it easy for the operator of the projector to reliably position the sheet on the projector board 12.

The negative sheets are exposed one by one to the selected images of the live-action film. Together with the marks on the glass plate, also the frame numbering of the film is projected onto the negative sheet. By changing the setting of the zoom lens, the proportions of the image can be altered. By laterally displacing the base plate, the cadre of the image can be shifted.

An exposed negative sheet is removed from the projector board and introduced together with, but separated therefrom, a positive-type silver halide diffusion receptor sheet 17 (called hereinafter the positive sheet) in a diffusion transfer processor. The firmly adhering sheets that leave the processing apparatus are peeled apart as illustrated in FIG. 2b, and after drying the positive sheet 17, which constitutes the "servaisgraph" as defined hereinbefore is provided with perforations 18 (see FIG. 2c). These perforations are made with relation to the images 19 of the marks 15 on the sheet and although this may occur by hand, it is preferably done on an automatic self-positioning apparatus that has means for orienting the punch block in accordance with the marks on the sheet, or for orienting the sheet with respect to the punch block. The punching of the sheet is important for the registering of the sheet image during the phases that will now be described. For the punching of the sheet the ACME punch, the OXBERRY punch, or any other type of punch may be used. Which punch is used is unimportant so long as all people in the studio use the same one.

In the performance of the process according to the present invention, it has been shown that excellent results were obtained by the use of diffusion transfer materials COPYPROOF CPTN and CPF manufactured by AGFA-GEVAERT N.V., Mortsel, Belgium. COPYPROOF CPTN is a high-sensitive, orthochromatic, polyethylene coated paper for continuous-tone optical work that is used as the negative, and COPYPROOF CPF stands for clear polyester film that is used for the positive. The sheets were processed in the UP 6400 automatic processor, marketed by AGFA-GEVAERT, in activator of the type COPYPROOF CP296b.

The servaisgraphs 17 showing the actors on a clear background are next used by the contour artists to draw the contour images. This is done as follows, with reference to FIG. 3a. The servaisgraph 17 is placed on a light box 18 and a drawing sheet 19 of translucent material (tracing paper) is placed over the servaisgraph. The sheet 19 has been perforated to register with the sheet 17 on a row of pegs 20. The contour artist looks for the contours of the distinct areas of the image of the characters on the servaisgraph, traces them and turns them into a single fine outline by means of a fine pencil.

Then the cels are made. Referring to FIG. 3b, the contour image 19 is placed in reversed position on a light box 21, and a perforated transparent sheet 22 is put in register with the sheet 19 by means of a row of pegs 23. The back of the sheet 22 is then painted by painters according to the color models. Finally, each sheet 22 is provided on its front side with a number that corresponds with the number of the contour image, and thus with that of the servaisgraph.

In the meantime, the background has been made. This can be drawn or painted as known in the art, based on the guiding images of the strips B of the live-action film, but it can also be made in three dimensional form that has been transformed in a combination of servaisgraphs and cels, as described hereinbefore for the characters.

Then comes the final phase of the process. Each cel 22 is assembled with its corresponding servaisgraph 17 and used in the animation camera 24, see FIG. 4, in a way as conventional cels are used in combination with the background 25 for the recording of the distinct frames of the color film.

The position of the background 25 may be fixed through a rear row of pegs 26 on the adjustable exposure board 28, whereas the position of the servaisgraph/cel combination is determined by a front row of pegs 27.

The process according to the invention eliminates any reality in the animation film. Yet there is a perfect symbiosis between the actors and the background whereby a completely new plastic dimension is obtained.

The "manipulations" of the image are almost unlimited, and it is even possible by appropriate selection and montaging, to return film stars who died a long time ago, to life again in a synthetised way, and to make them perform acts, and in particular to make them say lip-synchronous sentences, they never did.

In case horizontal panoramic movements of the animation images will be used in the animation stand, it is necessary that longer sheets for the servaisgraphs and corresponding cels be used. Longer servaisgraph sheets, however, require an additional operation during their exposure in order to remove the black image cadre of the frame of the live-action film, which otherwise would come within the exposure field of the animation camera upon lateral shifting of the sheet. The extra operation comprises the following steps: the production of a transparent mask which covers the exposure field of the projector 11 in FIG. 2a, and whereon the images of the characters have been masked, e.g. by means of a retouching sprayer, and the exposure of the negative light-sensitive sheet 10 through this mask to uniform lightning, in order to expose the complete sheet, except for the characters already exposed during the image-wise exposure by the projector 11. A mask for screening the characters is also required in those cases wherein the background of the live-action film is not transparent, such as in the case of use of conventional live-action films, for trick purposes as described hereinafter with reference to "manipulations" of an image.

The process according to the invention is not limited to the particular photographic intermediate steps that have been described hereinbefore. According to an extreme simplification, a negative- or a reversal-type live-action film may be enlarged on an appropriate photographic material that produces a positive image with a good contrast and a clear background that may be directly used as the servaisgraph. This method, however, has the disadvantage that all manipulations that are required for the selection, the combination, the repetition, etc. of image frames in order to obtain a desired effect, are carried out on the original live-action film, which usually is a valuable document.

Therefore, it may be preferred to make a photographic copy of the live-action film, and to use this copy for the selection of the images that will be servaisgraphed.

The production of the servaisgraphs need not necessarily occur with photographic materials of the DTR-type, but a one step photographic material may be used as well to produce directly a positive enlargement of a live-action image. For instance, a graphic negative-type continuous tone film may be exposed to a negative copy of the live-action film to produce a servaisgraph. Alternatively, a graphic reversal-type film may be exposed to a positive copy of the live-action film. This may have the additional advantage that no optical registering marks must be provided during the production phase of a servaisgraph. As a matter of fact, since photographic sheets onto which the projection of the live-action image occur are perforated so that they accurately match on the projection table and the film frame position in the projector is fixed, the position of the projected film frames onto the photographic enlargement is thus accurately determined, and the developed enlargement, i.e. servaisgraph, can directly be used to produce the contour drawing and then the character cel.

The process according to the invention may more economically be carried out by reducing—in those action fragments that permit the same—the number of servaisgraphs and cels to half the usume number, and by exposing each time two successive frames of the film in the animation camera to one servaisgraph/cel combination.

The exposure of register marks such as the crosses 15 of the glass plate 14 onto the light-sensitive material, may involve other expedients than are illustrated in FIG. 2a. As a matter of fact, the area around the image frame is usually not lit by the camera 11. Therefore, it may be necessary to provide the camera with suitable mask in the film holder, or with additional light sources to illuminate the area of the glass plate that comprises the register crosses. Alternatively, the glass plate 14 may be provided with a strip of black tape or the like, wherein suitable register marks are cut, thereby to expose on the light-sensitive material white marks on the black background. Such marks may be in the form of a rectangular block near one corner, and a square near the opposite corner, and a separate light source may illuminate such marks.

Finally, the technique of perforating the servaisgraphs with relation to the images of marks on the sheet that are produced on the sheet by register marks on the glass plate of the step-by-step projector board, may be replaced by other techniques that are based on the projection of suitable register marks, together with the images of the live action film.

According to a first embodiment, the camera for the taking of the live-action film may be arranged in such a way that there are exposed suitable register marks closely adjacent to an edge of the image frame on the film, through corresponding openings outside of but near to the image window of the camera. These exposed marks are developed together with the exposed images and they may, on the condition that the sharpness of reproduction is sufficient, serve for the direct control of the registering and the punching of the servaisgraphs.

According to a second embodiment, the step-by-step projector may be provided with suitable means, such as mask that is provided with cross-like slit aside of the projecting window, for the projection of register marks on the copy board, simultaneously with the image.

For both embodiments, the glass plate with the register marks of the step-by-step projector could be dispensed with, and the sheet to be exposed could be kept flat by a suitable vacuum system. In this way, the exposure of the system could be carried out more quickly.

I claim:

1. In a method for the production of a motion picture film combining at least one live-action subject and animation, in which a series of successive frames of a motion picture photographic color film are exposed in an animation camera to the combination of a background image and a superposed transparent cell sheet of such live action subject, and then photographically processed, the improvement which comprises the steps of:
    (a) producing photographic positive-type transparent enlargements of the images of selected frames of a black and white generally continuous tone live-action film of at least one subject, such enlargement carrying its image in a format which corresponds with the format of said background image, said image of such enlargement having a generally continuous tone grey gradation generally corresponding to the gradation of the image of the corresponding frame of said live subject film,
    (b) producing subject contour images from the subject enlargements by hand-tracing onto a drawing sheet the controus of the distinct areas of the images of said subject enlargements,
    (c) superimposing a transparent cell sheet upon each said subject contour image and applying to the areas of said cell sheet delineated by the underlying contour image opaque colorant of appropriate coloration to said live action frames, and
    (d) forming a sandwich of each subject enlargement in registration with the corresponding cell sheet and combining said sandwich with the background image for the exposure of a frame of said motion picture film in said animation camera.

2. Method according to claim 1, wherein the live-action film is a negative black-and-white film, and a positive high-contrast copy of this film is used for making said subject enlargements of the live-action images.

3. Method according to claim 2, wherein the positive copy has an optical background density which approaches to zero.

4. Method according to claim 1, wherein the performance of the subjects occurs against a white background.

5. Method according to claim 1, wherein said subject enlargements are made by exposing the image of each relevant frame of the positive copy of the live-action film, and also the image of appropriate registration marks, on a negative-type silver halide diffusion transfer sheet, developing said transfer sheet, and transferring the positive image of the live-action film and of the register marks onto a positive-type diffusion transfer sheet.

6. Method according to claim 5, wherein said animation pegs include registration pegs and the positive-type diffusion transfer sheets are punched to provide registration holes in accordance with the registration marks on the sheet, said registration holes corresponding with the registration pegs of the animation camera.

7. Method according to claim 1, wherein the contour images are produced by placing a semi-transparent sheet in registered contact with a said subject enlargement, and by tracing contours of the distinct areas of the subject image and turning these contours into a single outline.

8. Method according to claim 1, wherein the frames of the black-and-white films to be enlarged are selected on the basis of an acceptable test viewing of a video-recording which has been recorded by the frame-by-frame exposure of the selected frames of the live-action film, so that the frames can be readily manipulated, decelerated, frozen, reversed, etc.

9. Method according to claim 1, where, in those cases wherein black borders of the film frames for the actor enlargements are disturbing, the photographic sheets onto which the enlargements are exposed, are covered with a transparent mask that masks the subjects and are subjected to a second, uniform exposure.

* * * * *